United States Patent
Underhill et al.

(10) Patent No.: US 8,176,417 B2
(45) Date of Patent: May 8, 2012

(54) CONSTRUCTING AND MAINTAINING WEB SITES

(75) Inventors: Mark Underhill, San Diego, CA (US); Claudio Canive, San Diego, CA (US)

(73) Assignee: Platformic, Inc., San Diego, CA (US)

( * ) Notice: Subject to any disclaimer, the term of this patent is extended or adjusted under 35 U.S.C. 154(b) by 359 days.

(21) Appl. No.: 12/604,230

(22) Filed: Oct. 22, 2009

(65) Prior Publication Data

US 2010/0107056 A1  Apr. 29, 2010

Related U.S. Application Data

(60) Provisional application No. 61/107,618, filed on Oct. 22, 2008.

(51) Int. Cl.
 *G06F 17/00* (2006.01)
 *G06F 15/16* (2006.01)
(52) U.S. Cl. ........ 715/243; 715/205; 715/234; 715/235; 715/249; 709/203; 709/227
(58) Field of Classification Search .................. 715/200, 715/201, 202, 204, 205, 209, 231, 234, 236, 715/239, 243, 249, 255, 256, 273, 274, 700, 715/731, 738, 746, 760, 788, 793; 709/201, 709/202, 203, 204, 217, 218, 219, 221, 223, 709/227
See application file for complete search history.

(56) References Cited

U.S. PATENT DOCUMENTS

| | | | | |
|---|---|---|---|---|
| 7,941,783 | B1 * | 5/2011 | Kishnani et al. | 717/100 |
| 7,958,125 | B2 * | 6/2011 | Yan et al. | 707/737 |
| 2006/0173985 | A1 * | 8/2006 | Moore | 709/223 |
| 2007/0027932 | A1 * | 2/2007 | Thibeault | 707/200 |
| 2007/0239726 | A1 * | 10/2007 | Weiss et al. | 707/10 |
| 2007/0245238 | A1 * | 10/2007 | Fugitt et al. | 715/700 |
| 2009/0006454 | A1 * | 1/2009 | Zarzar et al. | 707/102 |
| 2009/0327320 | A1 * | 12/2009 | Yan et al. | 707/101 |
| 2010/0223322 | A1 * | 9/2010 | Mott et al. | 709/203 |

OTHER PUBLICATIONS

Lin et al. "An Easy-To-Use Feed Middleware for Application Development with RSS/Atom Feeds", IEEE Computer Society, 2007, pp. 567-572.*
Kart et al, "A Collaborative Computing Infrastructure Based on Atom", IEEE, 2008, pp. 305-312.*
Garrett, "Ajax: A New Approach to Web Applications", Feb. 18, 2005, 5 pages.*
D. Sureau, "Ajax Tutorial (Asynchronous Javascript and XML)", 2006, 7 pages.*

* cited by examiner

*Primary Examiner* — Maikhanh Nguyen
(74) *Attorney, Agent, or Firm* — Mintz, Levin, Cohn, Ferris, Glovsky and Popeo, P.C.

(57) ABSTRACT

Creation and maintenance of a web page can be facilitated using an interactive web application that runs in a browser at a client machine. The interactive web application can be provided to the client machine over a network by a development application at a server. Using the interactive web application, a user can configure various aspects of a web page, including but not limited to layout, colors, fonts, tools, live dynamic content, and the like, directly on the sever without knowledge of mark-up language coding or other techniques such as cascading style sheets.

14 Claims, 12 Drawing Sheets

CONSTRUCTING AND MAINTAINING WEB SITES

CROSS-REFERENCE TO RELATED APPLICATION

This application claims the benefit of U.S. provisional patent application Ser. No. 61/107,618, which was filed on Oct. 22, 2008 and entitled "Constructing and Maintaining Web Sites," the disclosure of which is incorporated by reference herein in its entirety.

TECHNICAL FIELD

The subject matter described herein relates to creation, construction, and/or maintenance of web content and web sites.

BACKGROUND

Web site designers and programmers have historically used a variety of products to build the structure of a web site and a different set of tools to assist in maintenance and modification of content within the context of the structure. For example, building the structure of a web site can be accomplished by using Cascading Style Sheets (CSS), a style sheet language that describes the presentation of a document written in a markup language. A typical application of CSS is to style web pages written in Hypertext Markup Language (HTML) and Extensible Hypertext Markup Language (XHTML). The CSS can also be applied to various kinds of Extensible Markup Language (XML) documents, including Scalable Vector Graphics (SVG) and XML User Interface Language (XUL). Generating or modifying a web page that includes complex functionality can involve the use of multiple applications to prepare the necessary coding. In many instances, knowledge of coding languages and/or other specialized applications or protocols can be necessary to competently prepare a modern web page. Additionally, typically available web page generation tools are typically executed at a local machine to prepare the code necessary to implement a web page. This code is then uploaded to a server to implement the web page for access over a network. When modifications to the web pager are required, the coding is modified and a new version is uploaded. This can lead to a frustrating cycle of uploading, testing, and re-uploading.

SUMMARY

In one aspect, a computer-implemented method includes a development application executing on the server receiving, from a browser executing an interactive web application on a client machine, a series of instructions pertaining to creation or modification of a web page. The instructions are entered by a user of the client machine via interaction with a plurality of user interface elements displayed by the interactive web application in the browser. The instructions in the series of instructions relate to one or more of a layout including one or more divisions of the web page, one or more CSS properties for displaying one of the one or more divisions of the web page, one or more content feeds providing content to be displayed in one of the one or more divisions of the web page, a content tool to handle the one or more content feeds in the one of the one or more divisions of the web page, and a configuration of the content tool defining how the content tool handles the one or more content feeds. Upon receipt by the server of one or more of the series of instructions, the development application generates a mark-up language coding that modifies the layout and one or more functions of the web page based on the received one or more of the series of instructions. Upon receipt of a request entered by the user at the interactive web application, the development application transmits the mark-up language coding to the interactive web application for display in the browser as a real time preview of the web page. Upon receiving a request from the user to save changes to the web page from the interactive web application at the server, a final mark-up language coding for the web page is stored in a database accessible to the server.

In some variations one or more of the following can optionally be included. One or more content items can be assigned to a specific content feed and an identifier can be associated with the specific content feed at the server. The one or more content items can originate from a content provider external to the server. The series of instructions include the identifier, a designated division of the web page within which to display the specific content feed in the web page, and a selection and configuration of a specific content tool to handle the specific content feed. The server can provide the final mark-up language coding to a second browser that navigates to a web page address identifying the web page such that the second browser displays the web page with the specific content feed provided dynamically, with the properties of the designated division, and in accordance with the configuration of the specific content tool.

In further optional variations, the one or more content items can include one or more of text, image files, video files, and audio files. The specific content tool can be selected from ad server position tools, archive tools, blog/feed tools, building block tools, calendar tools, contest tools, feed multi tools, feed slideshow tools, form module tools, forum/message board tools, full text tools, gallery module tools, HTML code drop tools, keyword search box tools, landing pad tools, media player tools, log-in block tools, navigation tools, podcast feed and multi-tools, poll module tools, RSS feed pull tools, simple text tools, scheduled content tools, tab set tools, user generated content tools, and video blog/feed tools. Prior to the providing of the interactive web application from the server, the server can receive from the client machine a request to initiate the instance of the development application at the server. The receiving of the request can include receiving indication from the browser application on the client machine that the user has directed the browser to navigate to a uniform resource locator (URL) designating the development application. The interactive web application can be delivered from the development application executing on the server to the browser executing on the client machine. The server can provide the final mark-up language coding to a second browser that navigates to a web page address identifying the web page such that the second browser displays the web page. The interactive web application can include an asynchronous Javascript and XML (AJAX) application.

In still further optional variations, the series of instructions can include a web page layout selection that defines the layout for the web page including one or more divisions of the web page, a CSS properties selection that defines the CSS properties for one or more divisions of the web page, a content selection that designates one or more specific content feeds whose contents are to be displayed in one or more divisions of the web page, and/or a content tool selection that identifies a content tool for inclusion in a division of the web page to provide content and a content tool configuration selection that defines how the content tool configures the content provided via the content tool. An administrative console accessible by navigating the browser to an administrative console URL can be provided by the development application. The administrative console can provide functionality for creating a new content tool or modifying default settings of an existing content tool.

In an interrelated aspect, a computer-implemented method includes activating a control console of an interactive web application executed in a browser on a client machine. The interactive web application is received over a network from a development application at a server implemented on one or more processors. A first modification of a web page CSS properties feature is received by the interactive web application by user interaction with a CSS properties feature user interface element provided in the browser upon selection by a user of a CSS properties feature option on the control console. A second modification of functionality of a specific tool to be displayed in the web page is received by the interactive web application by user interaction with a choose and configure tool user interface element provided in the browser upon selection by the user of a choose and configure tool option on the control console. A third modification of content to be provided within the web page is received by the interactive web application by user interaction with a content management user interface element provided in the browser upon selection by the user of a content management option on the control console. Instructions are relayed from the interactive web application to the development application based on the first modification, the second modification, and the third modification to the development application. The instructions cause the development application to generate a mark-up language coding that creates the web page based on the instructions. A preview of the web page is displayed in the browser upon selection by the user of a preview option on the control console. The displaying includes passing the mark-up language coding to the browser from the development application.

In optional variations, the browser can be directed to a uniform resource locator corresponding to an administrative console provided by the development application, and the administrative console can be interacted with via the browser to create or modify a content tool.

Articles are also described that comprise a tangibly embodied machine-readable medium operable to cause one or more machines (e.g., computers, etc.) to result in operations described herein. Similarly, computer systems are also described that may include one or more processors and a memory coupled to the processor. The memory may include one or more programs that cause the processor to perform one or more of the operations described herein.

The subject matter described herein can, among other possible benefits, provide improvements in several functional areas of web site development and deployment, including, but limited to, layout and presentation, functional implementation and content management. In this context, a web site can be accessible via the Internet or other networks, such as for example an organization's intranet, or even over a local area network. In some aspects, the current subject matter provides the capability to build and maintain a web property within the construct of single application. An extensible web development framework can be customized by an application developer and tailored to fit the needs of a particular individual or organization. A modern web site can be built and maintained to comply with Web 2.0 standards from within an application that is hosted on the server from which the web site is provided and that is accessible from any client machine via a standard web browser.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter includes a server-based development application that can be used to create new pages or modify existing pages for a web site. A interface provided by an interactive web application delivered to a browser on a client machine from the development application on the server can be used to create the layout of a web page by using a point and click methodology. The interface can use modules, or "tools" provided by programmatic elements. The programmatic elements can be added using point and click methodology. For example, programmatic tools can accept content based on user input or through third party content integration automation. Content can be edited using the same user interface, stored and repurposed throughout the web site or network of web sites. In some implementations, the programmatic functionality provided by various tools discussed herein can be added to the site without any code being written or uploaded by the user. Each tool can have its own console for controlling the various parameters and configuration options.

Maintenance and modification of web sites can be accomplished by using a content management systems (CMS), which is computer software that can be used to create, edit, manage, and publish content in a consistently organized fashion. A web content management system is a CMS designed to simplify the publication of content to web sites, in particular allowing content creators to submit content may or may not require technical knowledge of HTML or the uploading of files. Web site management tools such as those described herein can in some implementations be implemented using a solution stack based on the Linux operating system, Apache web server software, MySQL database management system or database server, PHP or other programming languages including but not limited to Perl and Python. These solutions are collectively referred to as LAMP. Other solutions can also be used.

Figure 1:
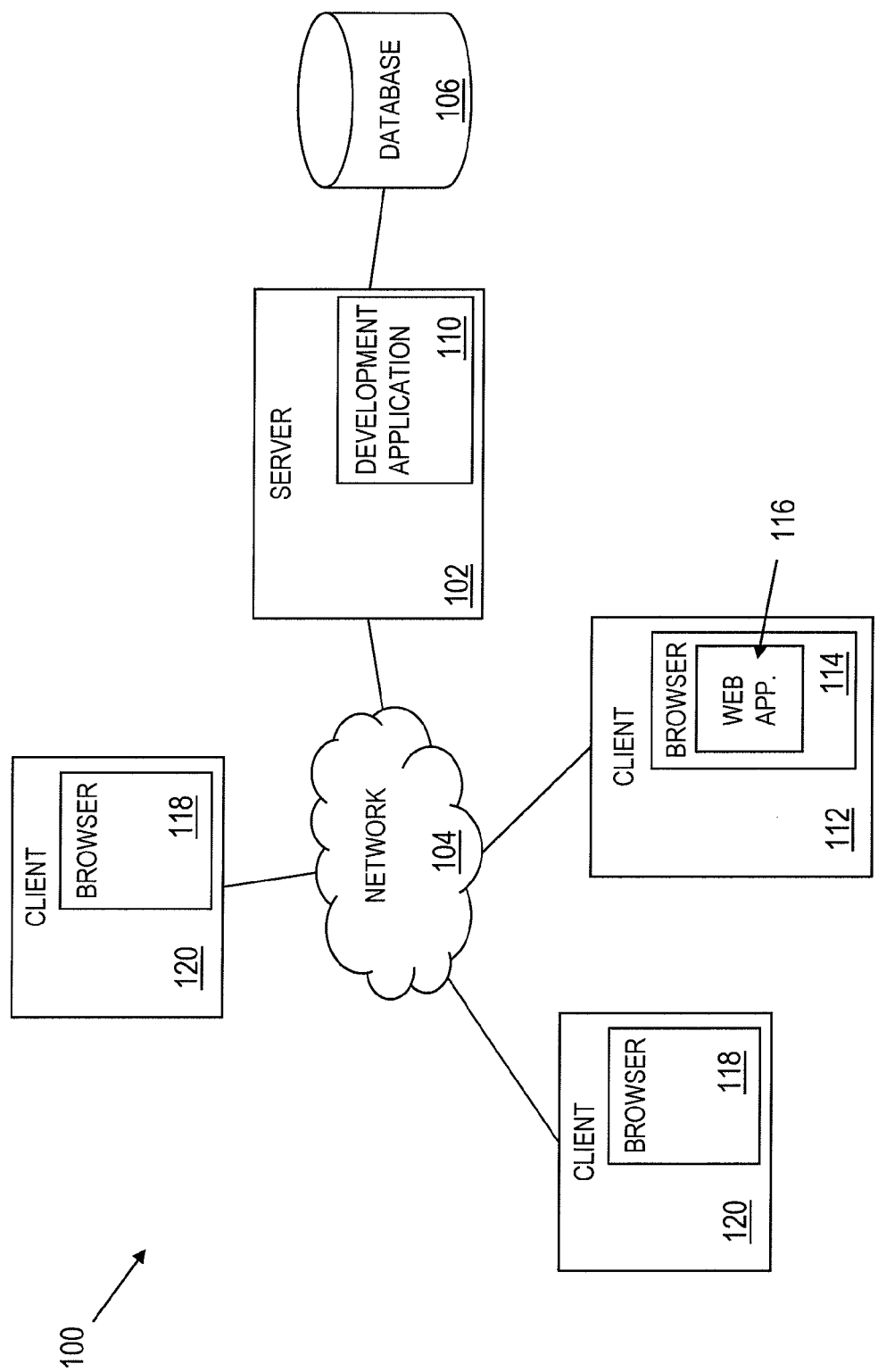
FIG. 1 is a diagram showing aspects of a system for constructing and maintaining web sites.

FIG. 1 illustrates a system 100 that can provide features of the current subject matter for constructing and maintaining web sites. A server 102 can be implemented on one or more processors and that is connected to a network 104. The network 104 can be the Internet, an intranet of an organization such as a company or enterprise, or another wide or local area network. The server can access a database 106, that can be located on the one or more processors or alternatively on other processors that are accessible via a network connection, for example other the network 104 or some other network. The server 102 includes a development application 110 whose functionality can provide one or more of the features of the current subject matter as described in greater detail below. A client machine 112 ca access the server either over the network 104 as shown in FIG. 1 or via some other network connection such as via a local or wide area network or the Internet). The client machine 112 implements a browser application via which a user of the client machine can access the server 102 and activate the development application 110. As described in greater detail below, the development application 110 delivers an interactive web application 116 that runs within the browser 114 to facilitate building and maintaining a web site that is stored on the database 106 so that other clients 120 can access the web site via the server 102 over the network 104 from within their browsers 118.

Figure 2:
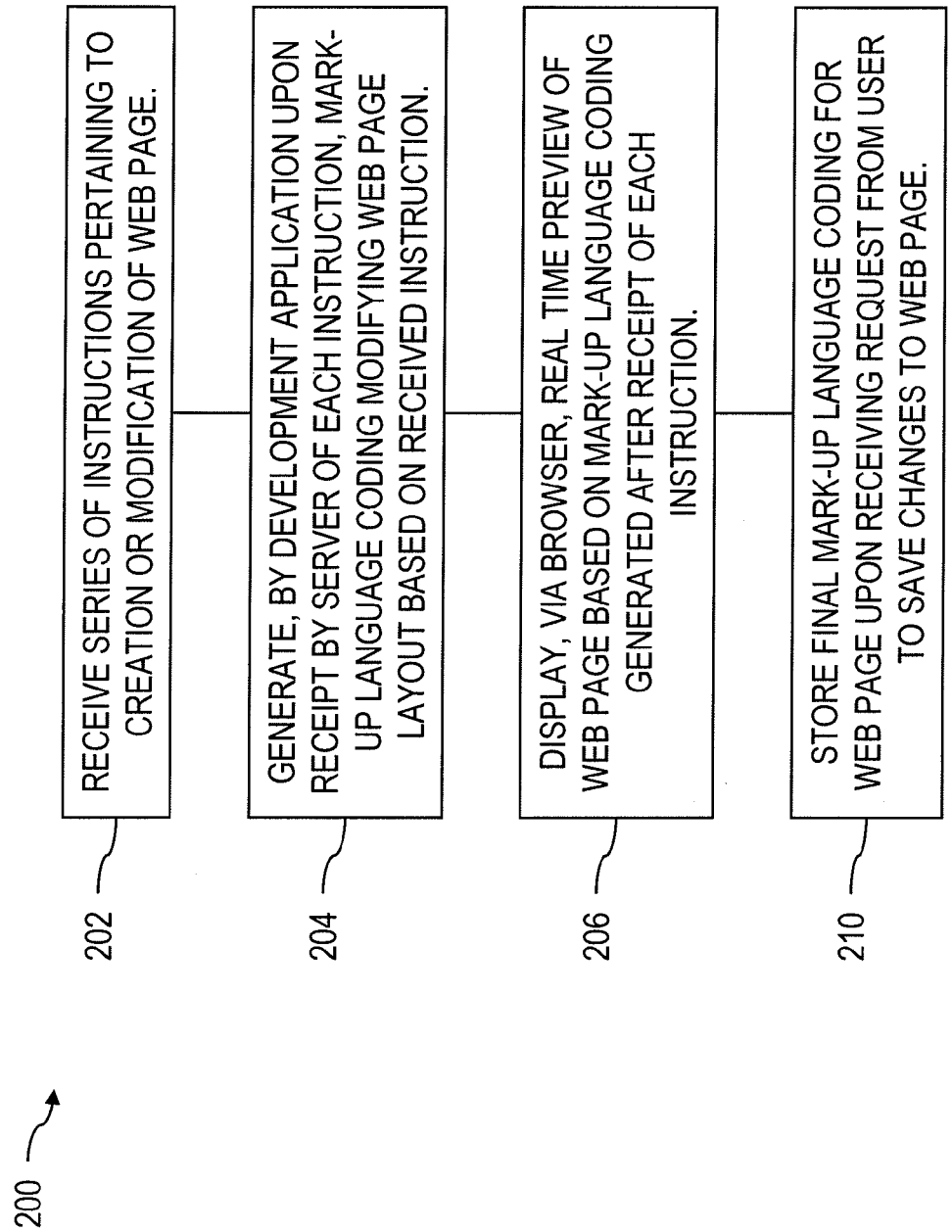
FIG. 2 is a process flow chart illustrating a method for constructing and maintaining web sites.

FIG. 2 shows a process flow diagram 200 illustrating aspects of a method for constructing and maintaining web sites. At 202, the development application 110 executing on the server 102 receives, from the browser 114 executing the interactive web application 116 on the client machine 112, a series of instructions pertaining to creation or modification of a web page. In some implementations, the interactive web application 116 can include an asynchronous Javascript and XML (AJAX) application. The instructions are entered by a user of the client machine 112 via interaction with a plurality of user interface elements displayed by the interactive web application 116 in the browser 114. Each of the instructions in the series of instructions can include one or more of a web page layout selection that defines one or more divisions of the web page, a fonts and colors selection that defines text settings and background colors for one of the one or more divisions of the web page, and a content selection that defines one or more contents feeds to be displayed in one of the one or more divisions of the web page. Each division can have its own formatting, for example as specified by CSS for the division. A division can be a block-level container in the coding necessary to display the web page on a browser. For example, a line feed can be included after the </div> tag in the coding.

At 204, upon receipt by the server of each instruction, the development application 110 generates a mark-up language coding that modifies the web page layout based on the received instruction. A real time preview of the web page based on the mark-up language coding generated after receipt of each instruction is displayed via the browser 114 at 206. At 210, a final mark-up language coding for the web page is stored in a database 106 accessible to the server 102 upon receipt of a request from the user to save changes to the web page. The request is received from the interactive web application 116 at the development application at the server 102.

After creation or modification of the web page is completed and the user sends a request to save changes to the web page to the database 106, the server 102 can send the final mark-up language coding to a second browser 118 on a second client machine 120 that navigates to a web page address identifying the web page. Upon receipt of the final mark-up language coding, the second browser 118 displays the web page.

Optionally, one or more content items are assigned to a specific content feed. An identifier is associated with the specific content feed at the server 102. The one or more content items originate from a content provider external to the server 102. The series of instructions include the identifier and a designated division of the web page within which to display the specific content feed in the web page. The server provides the final mark-up language coding to a second browser 118 that navigates to a web page address identifying the web page. The second browser displays the web page with the specific content feed provided dynamically and with the properties of the designated division. The one or more content items can include one or more of text, image files, video files, and audio files.

In some implementations, authentication of the user to create or modify the web page can be required. Prior to the server 102 providing the interactive web application 116 to the browser 114, the user can request to initiate the instance of the development application at the server 102. When this request is received at the server 102 from the client machine 112, the server 102 delivers the interactive web application 116 from the development application 110 executing on the server 102 to the browser 114 executing on the client machine 112. The request can include an indication from the browser 114 on the client machine 112 that the user has directed the browser to navigate to a network address, for example a uniform resource locator (URL), designating the development application 110 and can further include authentication information, such as for example a log-in identification and a password.

In some implementations, the development application 110, in concert with the interactive web application 116 executing within the browser 114, can allow a user to develop web sites through the web browser 114 without requiring the user to understand mark-up language coding. Using this approach, a fully compliant CSS layout can be created without using any 3rd party software. Additionally, because the development application can automatically generate coding, for example CCS applications and the like, based on user selections entered via the user interface of the interactive web application 116 in the browser 114 on the client machine 112, a web site can be built without the need to transfer files from a desktop PC to a public web server. Rather, the web pages are created directly at the server 102 by the development application based on instructions provided from the interactive web application 116. A user can manipulate layout and presentation of the web site through an onscreen WYSIWYG model that requires no access to a server, files or code. For example, fully compliant and validated CSS markup code can be generated automatically through a point and click mechanism that can, in some variations, include a control console 300 as described in greater detail below.

Figure 3:
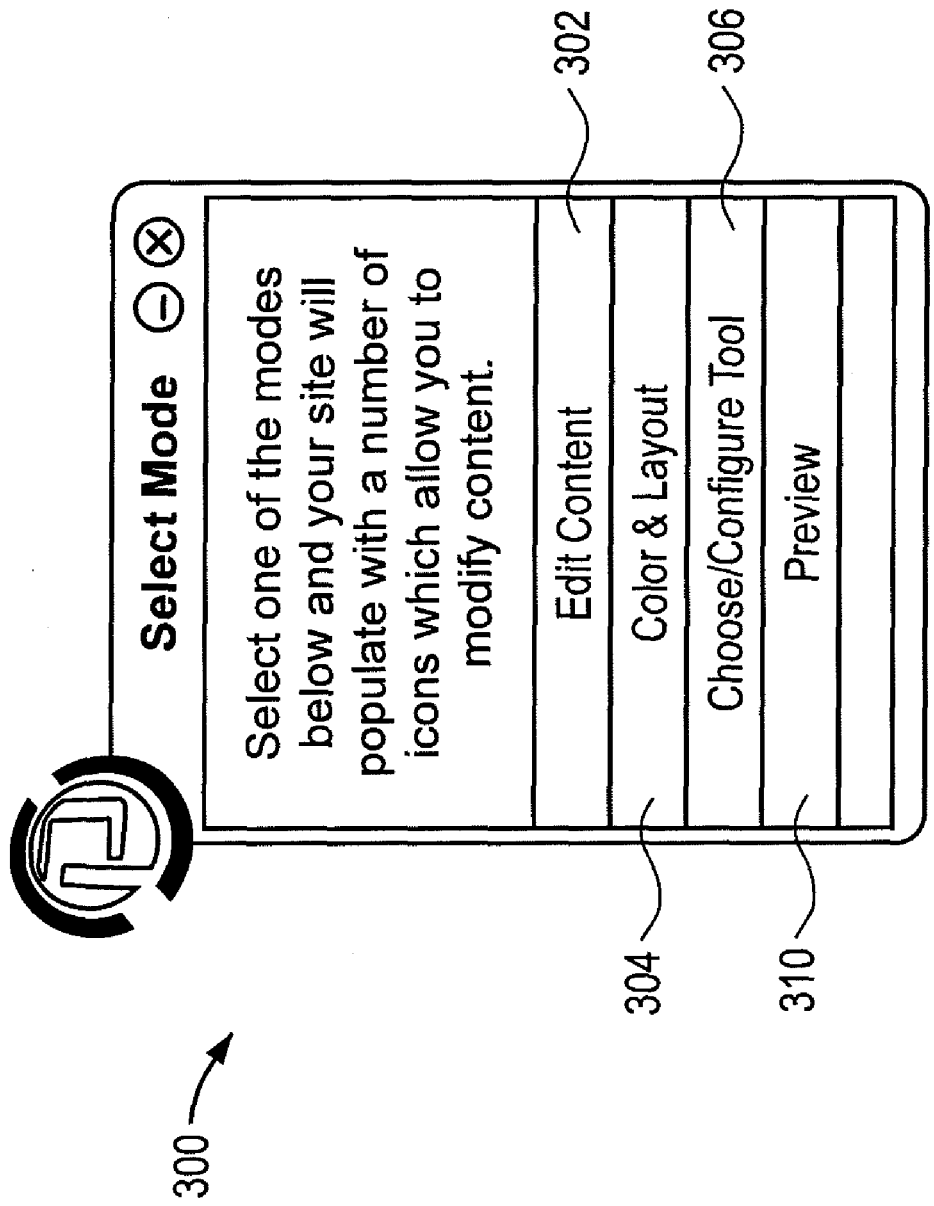
FIG. 3 is a screen shot illustrating a control console user interface element with options for manipulating the color and layout of a web page.

FIG. 3 shows an example of a user interface element that includes a control console 300 that can be displayed by the interactive web application 116 within the browser 114. The control console 300 can allow a user to invoke one or more functions of the current subject matter. The control console 300 can also be adjusted or presented based on specific permissions associated with a user. The control console 300 can be implemented as a floating dialog box. For example, the dialog box can always stay visible while the user navigates through different areas of the web site. The control console 300 can support several operation modes and permit selection by a user of one of these operation modes. For example, by using the console 300, a user can edit content 302, adjust color and layout 304, invoke a configuration tool 306, and preview how changes implemented to a web page will appear to a user who navigates to the site via a browser 310. One or more of these features, as well as other, optional functionality, can also be accessed via the control console 300.

Figure 4:
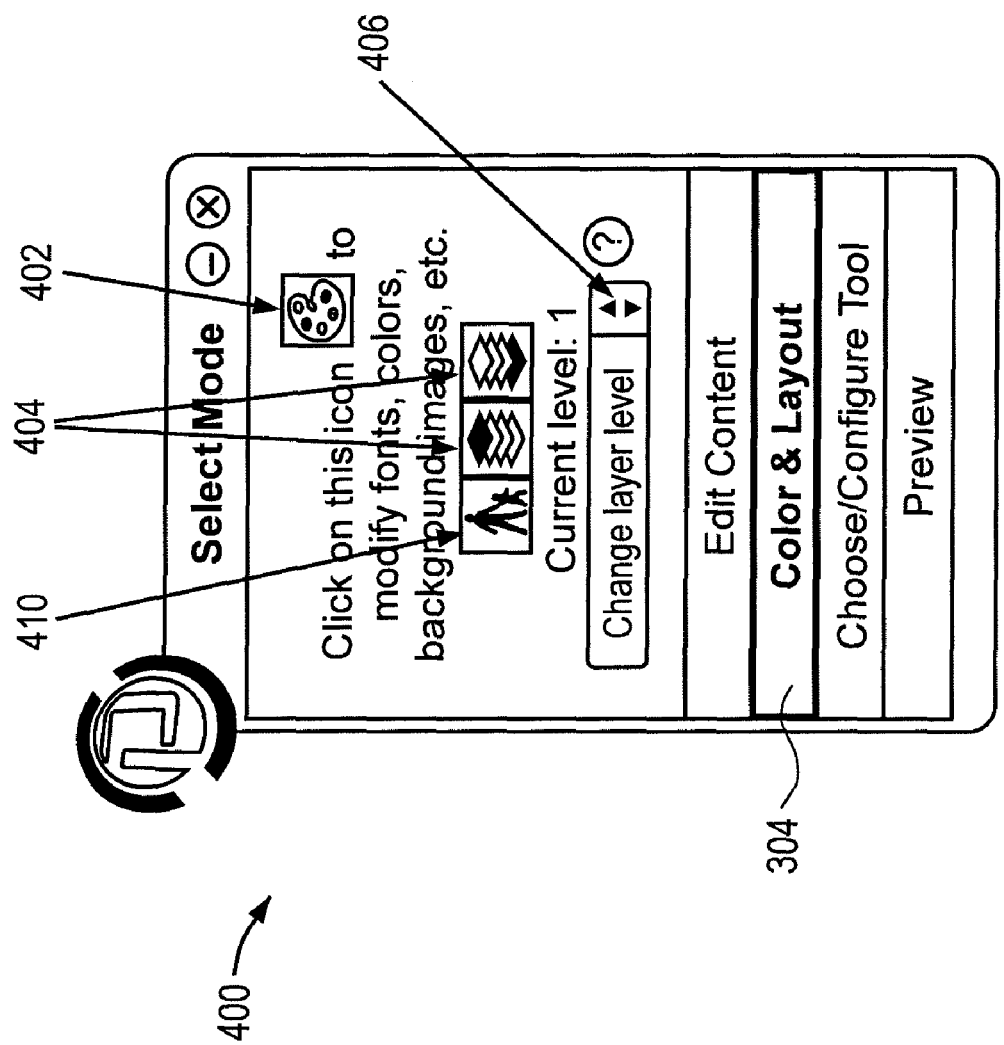
FIG. 4 is a screen shot illustrating a control console user interface element with options for manipulating the color and layout of a division of a web page.

FIG. 4 shows a screenshot 400 of a division-specific control console user interface element 400 with the color and layout option 304 selected for a given division of the web page being created or modified. A paint palette 402 can be displayed to provide control of various color aspects of the specific division of the web page that is being operated on. The control console 300 can also provide other user interface elements that enable navigation through a structure of nested divisions within a web page layout. Such elements can include buttons 404 for moving up and down through a nested division structure, a pull-down menu 406 for navigating directly to a given layer, or other control features. Parent/child relationships within the construct of the web site can be highlighted in a visually meaningful way using a parent/child relationship tool 410.

Figure 5:
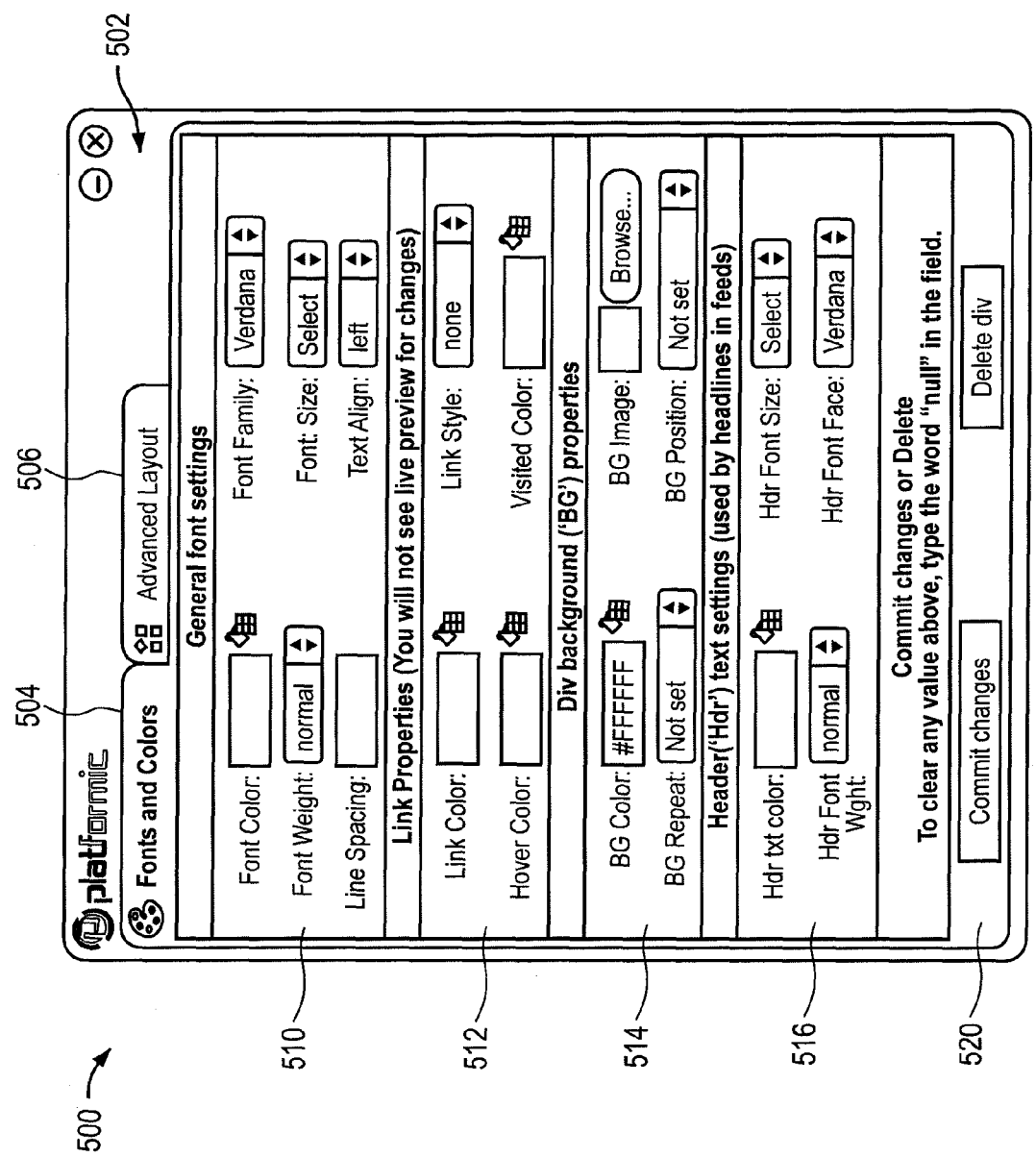
FIG. 5 is a screen shot illustrating a fonts and colors tab of a colors and layout user interface element.

FIG. 5 shows a screen shot 500 of a colors and layouts user interface element 502 that can be used to adjust colors, styles and layout of a web page. The colors and layouts user interface element 502 can, in some implementations, be reached by clicking on or otherwise selecting the color and layout option 304 on the control console use interface element 300 or the division-specific control console use interface element 400. In the example shown in FIG. 5, the colors and layouts user interface element 502 can include tabs for fonts and colors 504 and advanced layout 506. The fonts and colors tab 504 can permit the user to assign CSS style options to division backgrounds, text, and other content. In some variations, the fonts and colors tab 504 can be manipulated to adjust the look and feel of the web site, of a specific web page within the web site, or of a division within a web page. In some implementations, through direct interaction with the fonts and colors tab 504, a user can adjust the corresponding CSS property of the mark-up language coding for the web page that is stored at the server 102 in real-time. In other variations, visualizations can also happen immediately after the user input is made and become visible to the visitor once the changes have been committed. In the example shown in FIG. 5, the fonts and colors tab 504 includes controls for adjusting general font settings 510, properties of links 512 to other content within the division being edited, the background properties 514 of a division of the web page, and header text settings 516 for the division. One or more of these settings, as well as other related properties pertaining to the division being edited can be adjusted by selection of the fonts and colors tab 502 in the colors and layouts user interface element 500. Additional controls 520 can also be provided on the fonts and colors tab 504 for committing the changes made to the division and/or for deleting the division.

Figure 6:
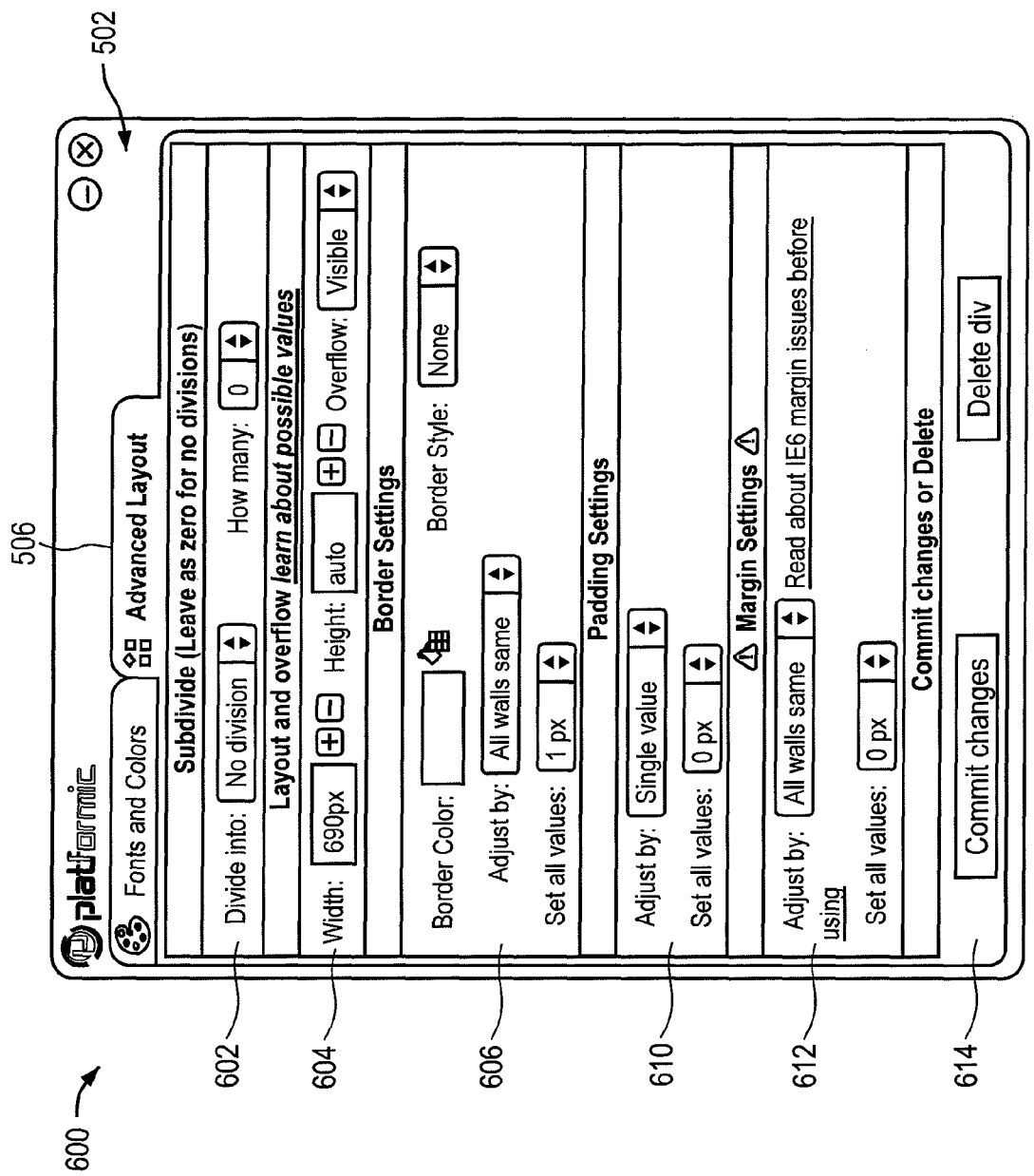
FIG. 6 is a screen shot illustrating an advanced layout tab of a colors and layout user interface element.

FIG. 6 shows a screen shot 600 of another example of the colors and layouts user interface element 502 with the advanced layout tab 506 selected. The advanced layout tab 506 allows a user of the interactive web application 116 to modify or create CSS properties for the web page. For example, the web page layout can be subdivided into different areas, called divisions. The sizes of each division can also be set or adjusted. The advanced layout tab 506 shown in FIG. 6 includes controls 602 for subdividing the web page into divisions. The width, height, and overflow allowance for the area of the web page itself (if there are no divisions) or for a specific division can be set at 604, for example to a given number of pixels or to auto for the width and height. Overflow selection options indicate how the page should be displayed if a browser navigating to the web page does not have the browser window sized to a sufficient height or width to fully display the web page or division content. Border settings 606 for the web page or a given division can also be set or adjusted via the advanced layout tab 506, as can a padding setting 610 indicating how many pixels or other distance should be provided as a visual buffer between the border or edge of one division and an adjacent division. Margins settings 612 can also be available for setting or establishing by a user via the advanced layout tab 506. The changes made on the advanced layout tab 506 can be committed, or the division can be deleted at 614.

In some implementations, when a user modifies the size of a division or a subdivides an existing division to create a new one, the development application can dynamically build an array that can be interpreted into a nested division structure. Once the divisions are made and new divisions are created, they can be manipulated, on page, in a manner consistent with the user interface provided in the browser 114 by the interactive web application 116.

Figure 7:
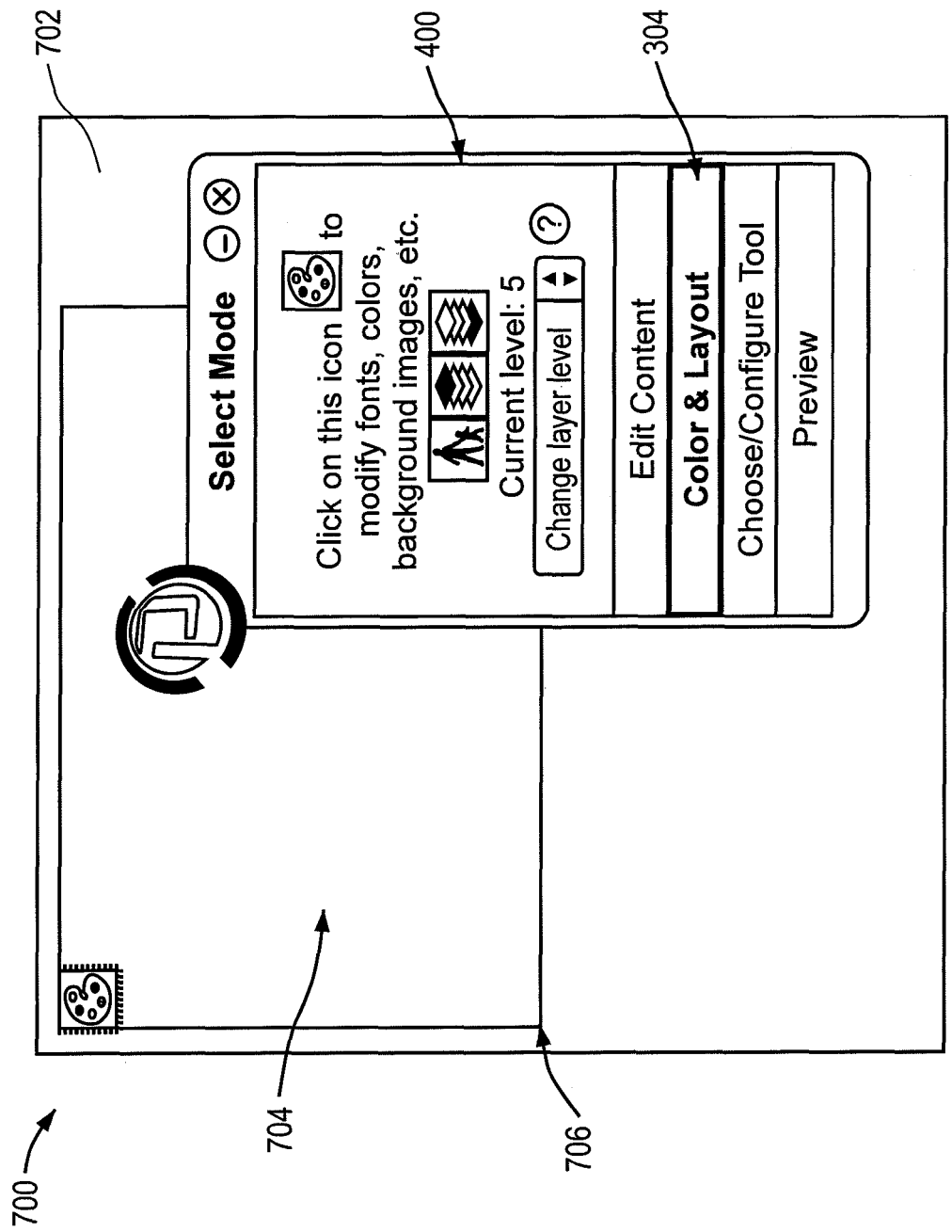
FIG. 7 is a screen shot illustrating a user interface showing a user-defined division on a web page.

FIG. 7 shows a screen shot 700 illustrating a display of the layout of a web page 702 shown to a user in the browser 114 by the interactive web application 116. Using a point and click methodology, the user can select dimensions of a division 704 to be included in the web page 702. The division-specific control console user interface element 400 is displayed to allow the user to access configuration options for the division, including but not necessarily limited to those configuration options described herein. In some implementations, a "tool tips" feature can be included to display information about the division 704 or the web page, for example in a floating window, when the user moves the cursor over a region and pauses momentarily. The displayed information can include, for example, the actual dimensions and relative placement of the division 704 in a division structure of the web page 702. An advanced layout tab 506, for example as described above, can be accessed via the division-specific control console user interface element 400 to modify the size of the division 704. When this occurs, the outline 706 of the division 704 is visibly changed in the user interface to reflect the changes in real time. This visual method of modifying the layout structure of a web page is intuitive and can greatly improve the efficiency with which a designer or developer can create the basic structure of a web site.

In some implementations, programmatic functions provided by the development application 110 can include navigational elements, links, calendars, forms, and galleries. Using the development environment provided by the interactive web application 116 at the browser 114 on a client machine 112 interacting with the development application 110 at the server 102, a web developer can write programs or scripts to extend the functionality of the development application 110. For example, scripts compatible with libraries available on the server 102 can be uploaded to a directory and become functions within the structure of the web site. The interactive web application 116 can also use the point and click methodology to apply programmatic functionality to a division 704 in the layout of a web page 702.

Figure 8:
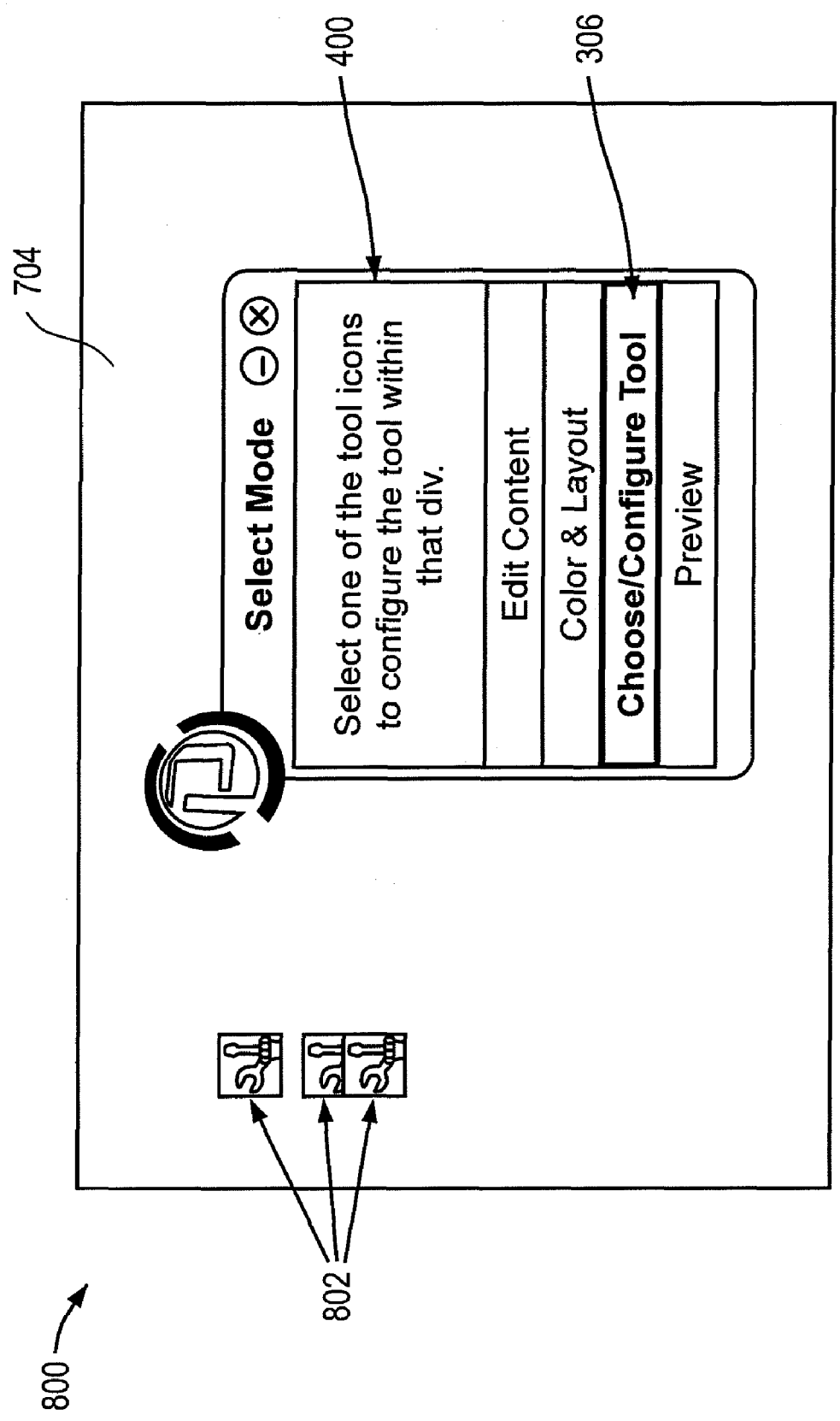
FIG. 8 is a screen shot illustrating a choose and configure tool interface.

FIG. 8 shows a screen shot 800 illustrating the division-specific control console user interface element 400 for a division 704 of a web page. Upon selection of the choose/configure tool option 306 by a user, tool icons 802 corresponding to content tools that can be added to and/or modified or configured for the division can be displayed. Selection of one of the tool icons 802, for example by clicking on it, allows addition of or modification to the corresponding content tool for the division 704. In this manner, various product tools or other tools created by a user or a third party through a provided application programming interface (API) can be activated for placement within the currently selected division 704. Content tools can be user configurable through the interactive web application 116 using a tool configuration console as described below.

Example of content tools that can be accessed via the tool icons 802 after selection of the choose/configure tool option 306, either in the division-specific control console user interface element 400 for a selected division 704 or the control console user interface element 300 for an undivided web page 702, include but are not limited to ad server position tools, archive tools, blog/feed tools, building block tools, calendar tools, contest tools, feed multi tools, feed slideshow tools, form module tools, forum/message board tools, full text tools, gallery module tools, HTML code drop tools, keyword search box tools, landing pad tools, media player tools, log-in block tools, navigation tools, podcast feed and multi-tools, poll module tools, RSS feed pull tools, simple text tools, scheduled content tools, tab set tools, user generated content tools, and video blog/feed tools.

An ad server position tool can provide means for delivering ad campaigns to a single site, a group of sites, or a user network. Campaigns can be built with single or multiple flights. Targeting rules can be defined to allow maximum flexibility. Campaign delivery can be impression-based or based on run dates. Metrics can be provided per complete campaign or per flight segment, and can be broken down to the impression/click per day. They can also be sorted by any time period.

An archive tool can provide a flexible way to present archived blogs, feeds, or podcasts. If the archive tool is placed on a web page 702 or a division 704 with a blog or feed it can create, among possible options, a calendar with clickable days and month headers to display blog/feed postings from whichever is clicked or a monthly-based listing of blog/feed headlines.

A blog/feed tool can provide means for creating blogs or feeds that can be added to a single site or a network. For example, an unlimited number of blogs can be added. Content can be added and edited using an easy-to-use, what-you-see-is-what-you-get (WYSIWYG) text editor. The editor can also upload and resize images, add rich media, and provide a toolbar for overriding or customizing font styles and text formatting. This module can automatically arrange and archive content according to parameters set by the user. The feed tool can be configured via a tool configuration console displayed in the interactive web application 116. For example, the tool configuration console can allows a user to select multiple display options for the feed content. The multiple display options can include, among other possible options, titles, summaries, or the full story of a news feed.

A building block tool can provide means to insert the same content on every web page on a web site and to update the content across the entire web site via a central control. Building blocks can be subsets of tools that can only be edited in a special layout. Changes to the building block tool can be reflected immediately on every web page that contains the building block tool. For example, a building block tool can be used for content that will be exactly the same across the site, for example mastheads, footers, and the like.

A calendar tool can provide means to insert one or more calendars on a site. Events can be added to the calendar using a WYSIWYG tool. Various style options can be available for formatting including a traditional numbered layout with clickable dates that opens a details page or an events list.

A contest tool can provide means to create contests and capture user registration data. Contests can be shared with a network, with a group of sites, configured for an individual site, or the like. Contest tools can be placed in any area of a web page 702 or division 704 or can be displayed as a list with links to a fully detailed web page.

A feed multi tool can provide means to place a combination of feeds from different sources into one list. Any number of configured feeds can be added to this area and treated like a single feed. A feed slideshow tool can provide means to display a number of feeds in a timed slideshow. The contents of several feeds, for example feeds containing images, can be displayed one after the other for a preset period of time. A feed slideshow tool can allow a user to display multiple headline stories in a compact area.

A media player tool can provide the ability to display or play media on the web page 702 or in a division 704. The media player tool can be embedded on the page or launched as a separate application. A podcast feed and multi-tool can allow audio or video clips to be added to the site as a feed. A user can also upload MP3 or WMV files. Audio or video clips can be organized like feeds and a really simple syndication (RSS) feed can be automatically generated. Alternatively, an audio or video clip can be directly downloaded from the web site by a web site visitor. The multi-tool can combine several feeds into one list. A RSS feed pull tool can provide the ability to display RSS feeds on the web site. For example, any RSS feed available on the Internet can be displayed as headlines or summaries. A video blog/feed tool can allow users to add video to the site. For example, MOV, AVI, RAW, or MPEG files or the like can be uploaded using this tool. The files can be compressed for playback in a Flash player. The user can choose from a set of thumbnails, enter a caption and add any story details.

A form module tool can provide means to place customized forms on a web page 702 to collect user information from the web site. Form data can be saved to a database 106 and downloaded, for example in a CSV format file, emailed to a designated recipient, or the like. Forms can be placed anywhere on a web page 702 or division 704 and can be configured using a main administrative console similar to that described below and shown in FIG. 11. Using the administrative console, a user can define fields and input elements for a form, including but not limited to default appearance of the form (for example size of fields, fonts, colors, layout, etc.). When a user selects a form module tool via the interactive web application 116 for inclusion in a division of a web page, the tool configuration console for the form module tool can permit the user to create a custom configuration for the form module tool, for example by resizing text entry fields, deleting one or more of the default fields or user interface elements, assigning new text formatting or backgrounds, and the like.

A forum/message board tool can provide means to place a message board, comment section, or other forum on a web page 702 or in a division 704 to allow visitors to the web site to comment on or discuss one or more topics. Forum data can be saved to the database 106. A forum or message board tool can be placed anywhere on a web page 702 or division 704. As with other tools, default settings for a forum/message board tool can be set user the administrate console. Using the forum/message board tool in the interactive web application 116, a user can modify the default settings for the forum/message board tool using a tool configuration console.

A full text tool can allow for text and images to be added to a web page 702 or division 704. The full text tool can support, among other possible features, local style overrides, HTML-editing, tables, drag and drop image uploads, document uploads (such as PDFs or Word documents), hyperlinks, and the like.

A gallery module tool can display a series of images, for example in several different formats. In some implementations, a gallery module tool can display single photos with next and previous buttons, or thumbnails and larger images. It can also display a series of galleries with links to the photos or provide other similar features.

A HTML code drop tool can allow for custom scripts or HTML and can also optionally support copy and paste into a textbox. One or more types of scripts and/or tags can be disallowed via input of user preferences due to security reasons.

A keyword search box tool can allow visitors to the web site to easily find content in blogs, text, podcasts, or other searchable content available on the web site or optionally over a larger network such as the Internet or World Wide Web. Keywords can be entered using the tools to add blogs, feeds, text, podcasts, and the like.

A landing pad tool can provide a place to display feed content, for example by allowing a user to create a special layout which can save time by generating a fully formatted web page for the content of a feed headline. The layout can be designed to match the look and feel of the rest of the web site, thereby creating a consistent and professional appearance. Each individual feed may not need a separate HTML page. The contents can simply be inserted into and displayed in the layout when a headline is clicked.

A log-in block tool can be provided to permit a web site visitor to log in to the site, in some examples for access to a discussion forum or to access premium content on the web site. This tool can display the visitor's name if the visitor is already logged in or remains logged in from a previous visit to the web site.

A navigation tool can provide a site-accessible navigation feature. Such a tool can be added to any layout within the web site once it is configured. Any modifications to the navigation set represented by the navigation tool can be made global. Specifically, with the help of a navigation tool, a user of the development application 110 may not have to access and individually update each web page at a web site. In some implementations, a navigation tool can automatically generate a new page layout based on its section when a link set to a non-existent page (other than the default URL) is clicked.

A poll module tool can provide the ability to collect responses and opinions to questions. Web site visitors can graphically see the results of the poll immediately, either upon casting a vote in the poll or by selecting an optional "view results" user interface element.

A simple text tool can provide the ability to add short segments of text, for example for a title or caption. Text can be set to global, making it easy to repeat titles over several pages of the web site or to a current page only, allowing for the reuse of sections for different pages.

A scheduled content tool can provide the ability to display content at certain times of the day, week, month, or other scheduled time. Content can contain text and images. The scheduled content tool can be used, for example, to display daily specials or what is playing or showing now. It can also show a default image during times when no scheduled events are to be displayed.

A tab set tool can allow more content to fit in a compact space. Tabs can be oriented horizontally or vertically. The tabs can contain images, for example one for each of an active or inactive state. The content of a tab can be either static or dynamic (such as feeds).

A user generated content tool can provide the ability to display information gathered from web site visitors, for example by a form, in a consistent and stylized format. This tool can arrange and format information collected from a form configured or designed using the form tool. It can also perform tasks such as resizing uploaded photos.

Using content tools and their associated tool configuration consoles as described herein can allow the addition of very sophisticated functionality to a web page or a web site without requiring the user to write or upload any code. A content tool can be built and its default settings established or modified using an administrative console provided by the development application 110 accessed directly via a browser 114 on a client machine 112. In this manner, technical programming requirements for creating a web site are removed. Web sites with very complex functionality can be created by a user via a very clear and uncomplicated user interface provided in a browser 114 by the interactive web application 116 which relays instructions entered by the user to the development application 110 at the server 102. The development application 110 prepares the necessary coding to implement the layout and functionality of a web page or web site in accordance with the relayed instructions.

Figure 9:
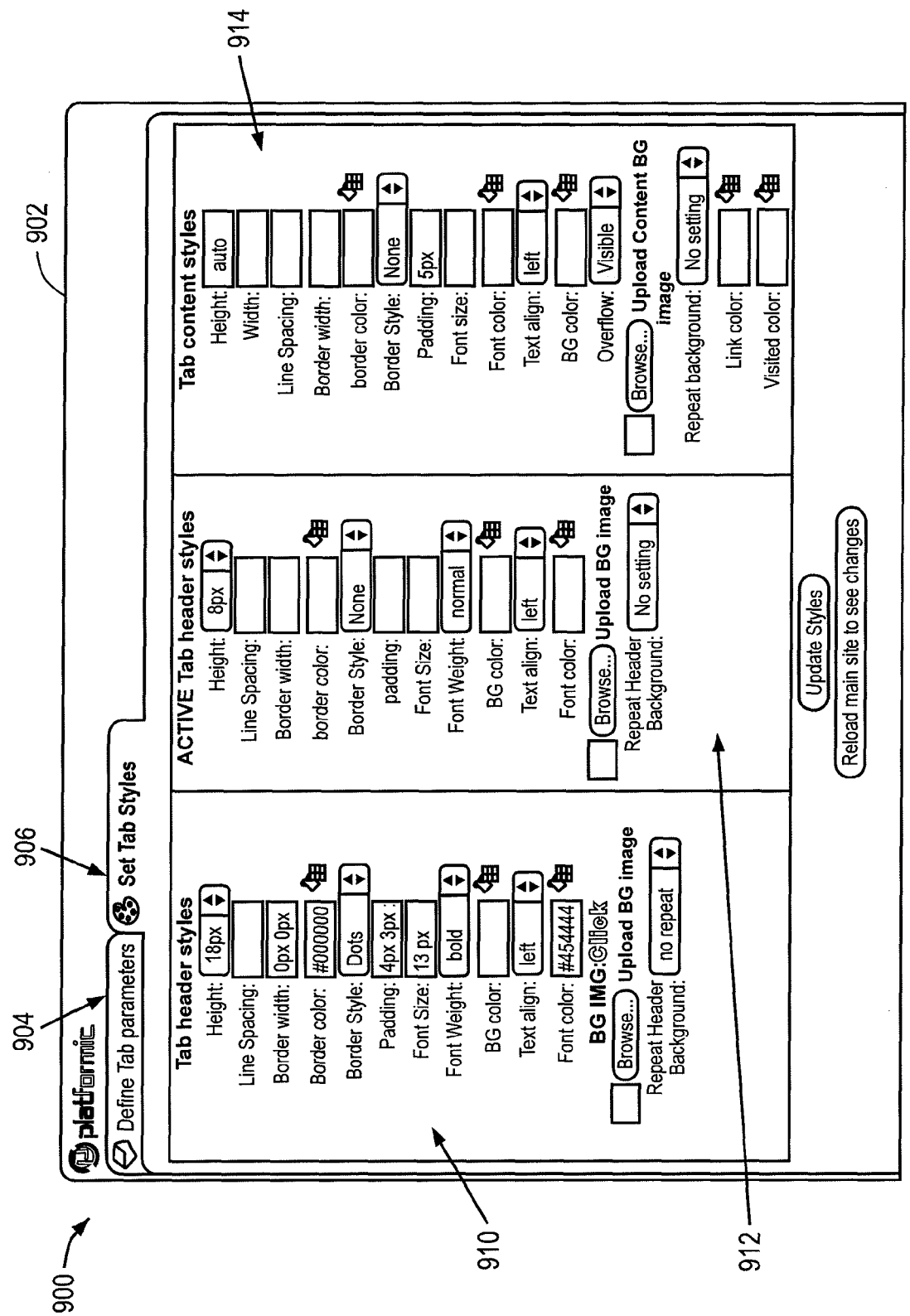
FIG. 9 is a screen shot illustrating a tool console for configuring a tool for insertion in a web page.

When a user selects one of the tool icons 802, a tool configuration console can be displayed for the corresponding content tool. FIG. 9 shows a screenshot 900 illustrating a tab set tool configuration console 902 according to an implementation. The tab set tool configuration console 902 shown includes two tabs, one for defining tab parameters 904 and a second for setting tab styles 906. The setting tab styles tab 906 selected in the screenshot 900 includes several user interface elements via which a user can set or modify tab header styles 910, active tab header styles 912, and tab content styles. Other options can also be included. A tool-specific tool configuration console can be displayed upon selection by the user of the tool icon 802 corresponding to a specific type of tool. Each tool-specific tool configuration console can include user interface elements that correspond to features of that tool.

In some implementations, a content management feature can be provided that allows for the separation of the content of the web page 702 from the display of that content. In this manner, the content throughout the web site can be reformatted, repurposed, and displayed to a web site visitor with the stylistic properties of the layout within which the content appears and according to configurable settings of the content tool via which the content is provided in a division of the web page. Content can be repurposed through the web site when it is assigned to a feed. A feed can represent a series of content items that are associated with a particular identifier. The identifier, or feed ID, can be referenced by the user, again using a point and click methodology, to any content area. The content can appear dynamically and inherit the properties of the division within which it is displayed and the content tool that provides it when the web page is displayed to a web site visitor.

Feeds can be shared within the same web site or within a network of web sites. This is known as a content syndication. The current subject matter can offer a high degree of flexibility with regard to feeds. This flexibility allows for a unique method of allowing network-wide content to be shown in the context of a single web site with a "punch out" for web site-specific content. More specifically, network shared content layout structures can be provided in which individual web sites can optionally insert unique modular content into the overall shared layout of a web site.

Feeds can contain text or rich media, for example images, video, and audio files, or any combination thereof. Feed configuration can be handled through the interactive web application 116 running in the browser 114 of a user at a client machine 112, or through the development application accessed via the administrative console, which is described in greater detail below.

Figure 10:
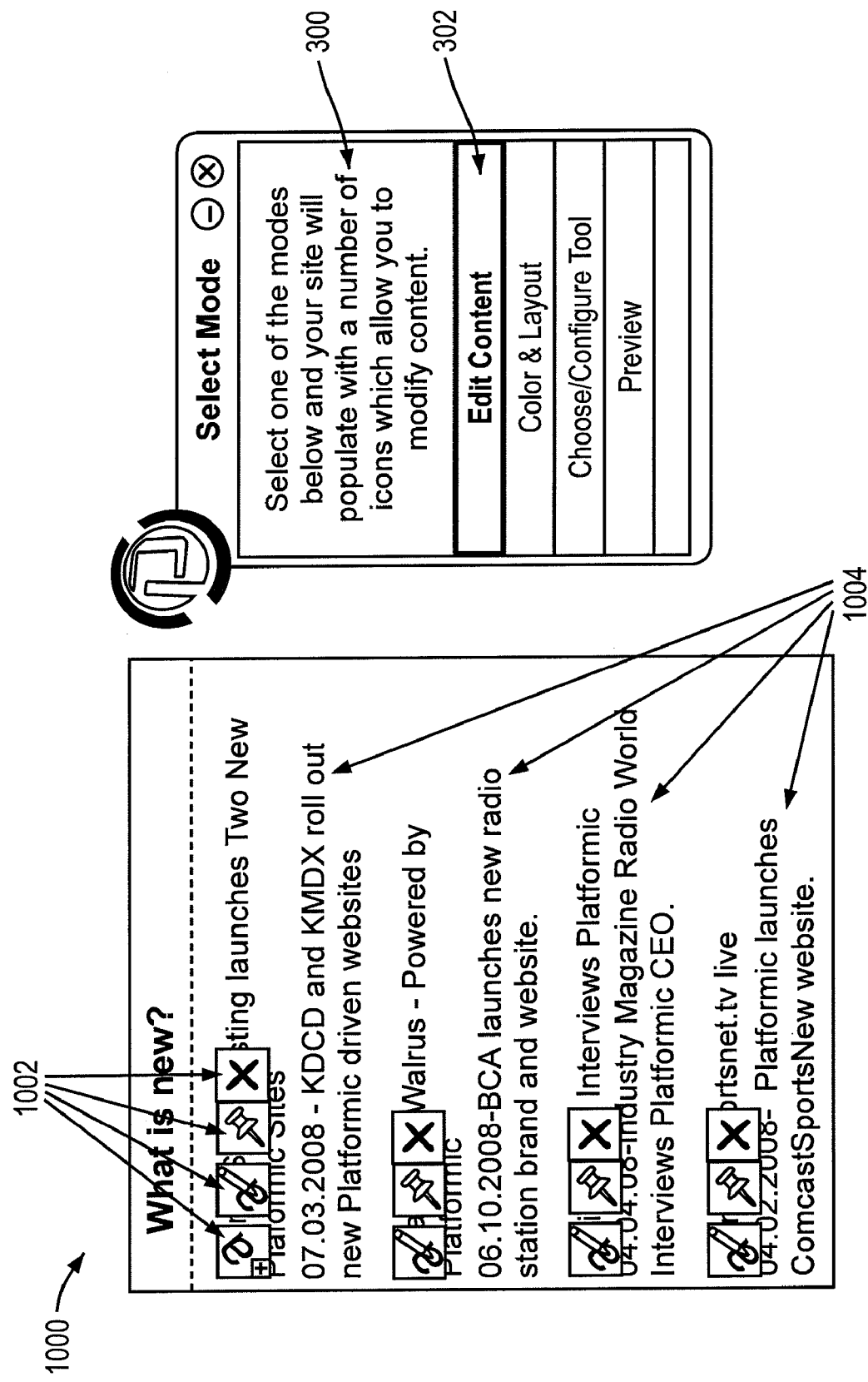
FIG. 10 is a screen shot illustrating an interactive web application interface for feed configuration.

FIG. 10 shows a screenshot 1000 illustrating controls 1002 that can be displayed when the edit content option 302 is selected in a control console 300. These controls 1002 can include options for deleting content, fixing the position of a specific content item at a position in the division or web page, editing the content, or creating new text or other content to be included in the content item. In the example shown in FIG. 10, the content items 1004 are news stories, for example from a news feed. Each news item includes a tide and summary of the content item 1004. Additional content can be accessed by a visitor to the web page by clicking through the content item 1004.

Figure 11:
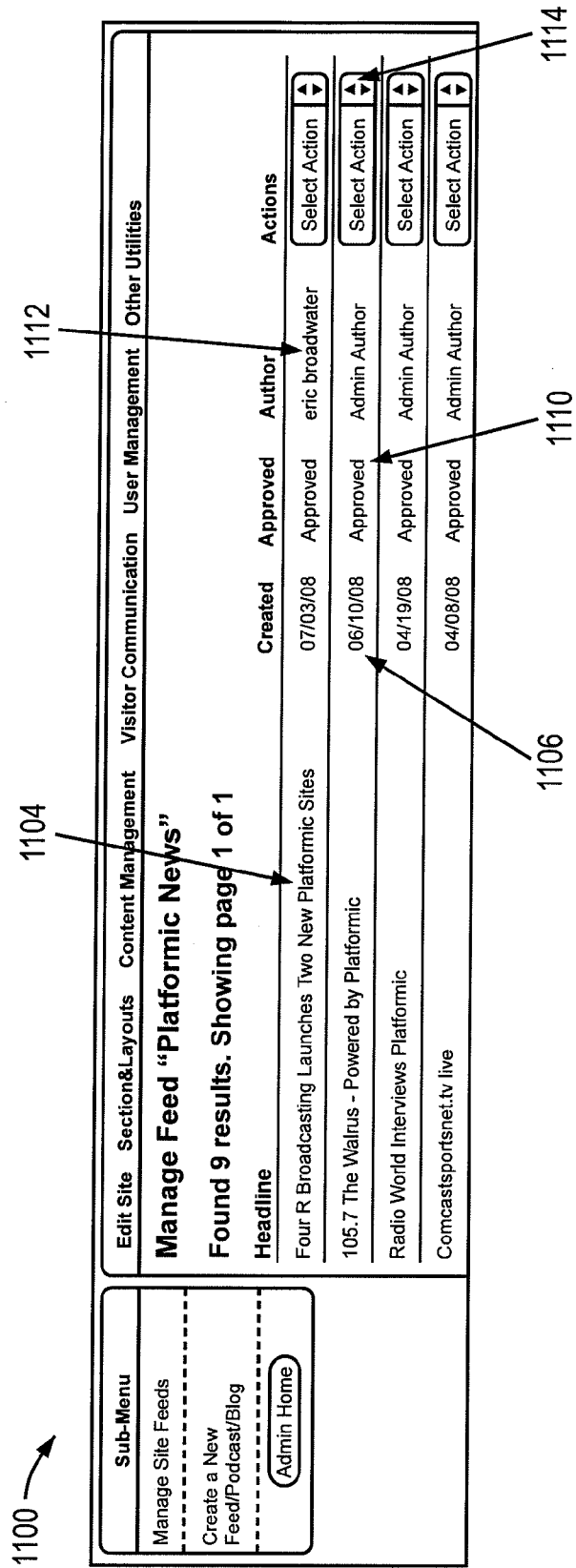
FIG. 11 is a screen shot illustrating a backend administrative console interface for feed configuration.

FIG. 11 shows a screenshot 1100 illustrating an example of an administrative console interface 1102 for feed configuration. The administrative console interface 1102 can be displayed in a browser 114, for example upon the development application 110 at the server 102 receiving authenticated log-in information from a user. The administrative console interface 1102 shown in the screenshot 1100 of FIG. 11 displays information from the same feed that the controls 1002 shown in screenshot 1000 of FIG. 10 can be used to modify. In the administrative console interface 1102, each content item, in this example a news story, is listed by title 1104 in a columnar format with columns for the creation date of the news story 1106, an indication whether the story is approved for display 1110, the story author 1112, and actions that can, in this example, be selected via a pull-down menu 1114 for each story. A user can access the administrative console interface 1102 directly via the browser 114 in the same manner as if the browser were directed to a secured web site. After entering log-in information, the user can build content tools or modify the default settings of existing content tools using a page or pages of the administrative console interface 1102 corresponding to the desired type of content tool. Other implementations of the administrative console interface 1102 besides that shown in FIG. 11 are possible.

Figure 12:
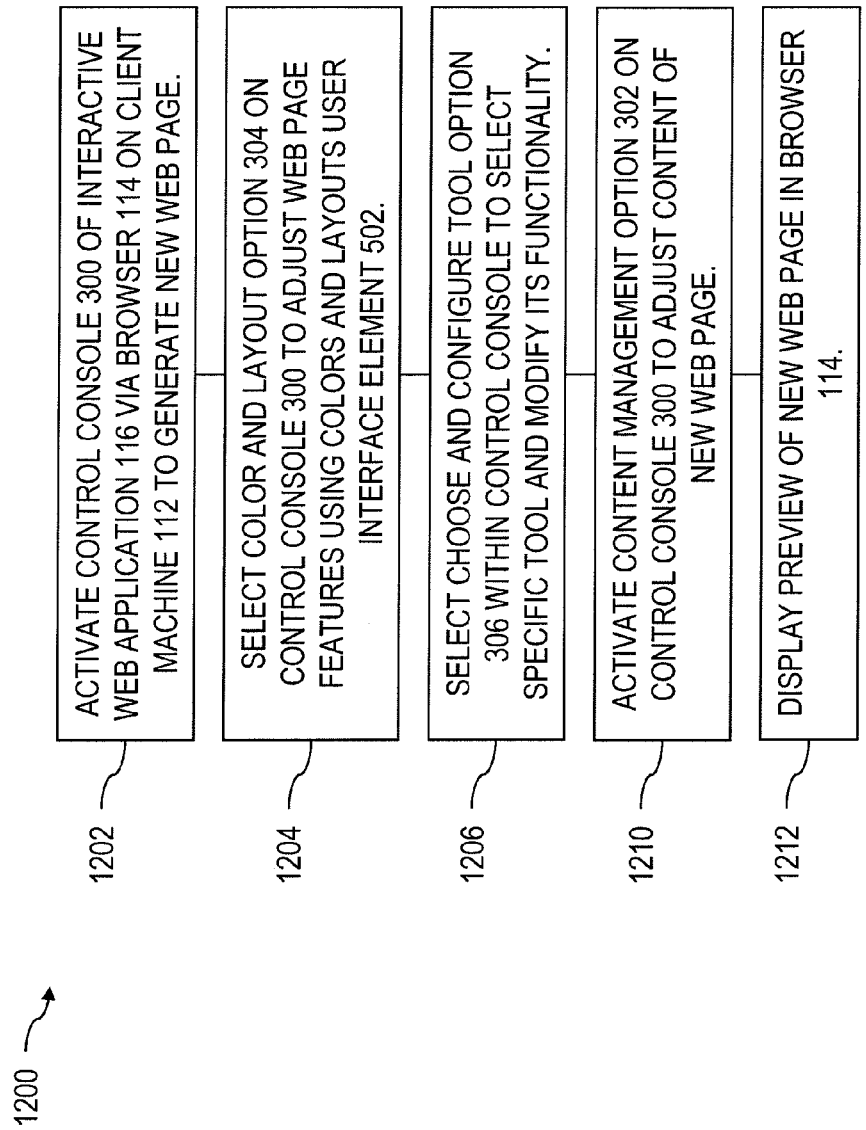
FIG. 12 is a process flow chart illustrating a method for generating a web page.

FIG. 12 shows a process flow chart 1200 illustrating a further implementation of generating a web site. At 1202, a user activates a control console 300 in an interactive web application 116 via a browser 114 on a client machine 112. At 1204, the user selects a color and layout option 304 on the control console 300. The user can adjust the newly generated website features using a fonts and colors tab 504 or an advanced layout tab 506 shown on a colors and layouts user interface element 502. At 1206, the user selects a choose and configure tool option 306 within the control console. Using an activated choose and configure tool for a tool selected for inclusion in the web page, the user can select a specific tool and modify its functionality. At 1210, the user can activate a content management option 302 on the control console 300. Using a content management console 1002, the user can adjust the content of the new web page. At 1212, the user can select a preview option 310 in the control console 300 to view a preview of the new web page in the browser 114.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

What is claimed:

1. A computer-implemented method comprising:
receiving, from a browser executing an interactive web application on a client machine, at a development application executing on a server, a series of instructions pertaining to creation or modification of a web page, the instructions being entered by a user of the client machine via interaction with a plurality of user interface elements displayed by the interactive web application in the browser, the instructions in the series of instructions relating to one or more of a layout including one or more divisions of the web page, one or more Cascading Style Sheets (CSS) properties for displaying one of the one or more divisions of the web page, one or more content feeds providing content to be displayed in one of the one or more divisions of the web page, a content tool to handle the one or more content feeds in the one of the one or more divisions of the web page, and a configuration of the content tool defining how the content tool handles the one or more content feeds;
generating, by the development application upon receipt by the server of each instruction, a mark-up language coding that modifies the layout and one or more functions of the web page based on the received series of instructions;
transmitting, upon receipt of a request entered by the user at the interactive web application, the mark-up language coding from the development application to the interactive web application for display in the browser as a real time preview of the web page; and
storing, in a database accessible to the server, a final mark-up language coding for the web page upon receiving, from the interactive web application at the server, a request from the user to save changes to the web page;
assigning one or more content items to a specific content feed and associating, at the server, an identifier with the specific content feed, the one or more content items originating from a content provider external to the server, the series of instructions comprising the identifier, a designated division of the web page within which to display the specific content feed in the web page, and a selection and configuration of a specific content tool to handle the specific content feed; and
providing, by the server, the final mark-up language coding to a second browser that navigates to a web page address identifying the web page, the final mark-up language coding causing the second browser to display the web page with the specific content feed provided dynamically and with the properties of the designated division and in accordance with the configuration of the specific content tool.

2. The computer-implemented method of claim 1, wherein the one or more content items comprise one or more of text, image files, video files, and audio files.

3. The computer-implemented method of claim 1, wherein the specific content tool is selected from ad server position tools, archive tools, blog/feed tools, building block tools, calendar tools, contest tools, feed multi tools, feed slideshow tools, form module tools, forum/message board tools, full text tools, gallery module tools, Hypertext Markup Language (HTML) code drop tools, keyword search box tools, landing pad tools, media player tools, log-in block tools, navigation tools, podcast feed and multi-tools, poll module tools, really simple syndication (RSS) feed pull tools, simple text tools, scheduled content tools, tab set tools, user generated content tools, and video blog/feed tools.

4. The computer-implemented method of claim 1, further comprising: prior to the providing of the interactive web application from the server, receiving, at the server from the client machine, a request to initiate the instance of the development application at the server, the receiving of the request comprising receiving indication from the browser application on the client machine that the user has directed the browser to navigate to a uniform resource locator (URL) designating the development application.

5. The computer-implemented method of claim 1, further comprising: delivering the interactive web application from the development application executing on the server to the browser executing on the client machine.

6. The computer-implemented method of claim 1, further comprising: providing, by the server, the final mark-up language coding to a second browser that navigates to a web page address identifying the web page, the providing causing the second browser to display the web page.

7. The computer-implemented method of claim 1, wherein the interactive web application comprises an asynchronous Javascript and XML (AJAX) application.

8. The computer-implemented method of claim 1, wherein the series of instructions comprises a web page layout selection that defines the layout for the web page including one or more divisions of the web page.

9. The computer-implemented method of claim 1, wherein the series of instructions comprises a CSS properties selection that defines CSS properties for one or more divisions of the web page.

10. The computer-implemented method of claim 1, wherein the series of instructions comprises a content selection that designates one or more content feeds whose contents are to be displayed in one or more divisions of the web page.

11. The computer-implemented method of claim 1, wherein the series of instructions comprises a content tool selection that identifies a content tool for inclusion in a division of the web page to provide content and a content tool configuration selection that defines how the content tool configures the content provided via the content tool.

12. The computer-implemented method of claim 1, further comprising providing, by the development application, an administrative console accessible by navigating the browser to an administrative console uniform resource locator (URL), the administrative console providing functionality for creating a new content tool or modifying default settings of an existing content tool.

13. A computer program product comprising a non-transitory machine-readable medium storing instructions that, when executed, cause one or more processors to perform functions comprising:
receiving, from a browser executing an interactive web application on a client machine, at a development application executing on a server, a series of instructions pertaining to creation or modification of a web page, the instructions being entered by a user of the client machine via interaction with a plurality of user interface elements displayed by the interactive web application in the browser, the instructions in the series of instructions renting to one or more of a layout including one or more divisions of the web page, one or more Cascading Style Sheets (CSS) properties for displaying one of the one or more divisions of the web page, one or more content feeds providing content to be displayed in one of the one or more divisions of the web page, a content tool to handle the one or more content feeds in the one of the one or more divisions of the web page, and a configuration of the content tool defining how the content tool handles the one or more content feeds;

generating, by the development application upon receipt by the server of each instruction, a mark-up language coding that modifies the layout and one or more functions of the web page based on the received series of instructions;

transmitting, upon receipt of a request entered by the user at the interactive web application, the mark-up language coding from the development application to the interactive web application for display in the browser as a real time preview of the web page; and storing, in a database accessible to the server, a final mark-up language coding for the web page upon receiving, from the interactive web application at the server, a request from the user to save changes to the web page;

assigning one or more content items to a specific content feed and associating, at the server, an identifier with the specific content feed, the one or more content items originating from a content provider external to the server, the series of instructions comprising the identifier, a designated division of the web page within which to display the specific content feed in the web page, and a selection and configuration of a specific content tool to handle the specific content feed; and providing, by the server, the final mark-up language coding to a second browser that navigates to a web page address identifying the web page, the final mark-up language coding causing the second browser to display the web page with the specific content feed provided dynamically and with the properties of the designated division and in accordance with the configuration of the specific content tool.

14. A system comprising
at least one processor; and
at least one non-transitory machine-readable medium storing instructions that, when executed, cause the at least one processor to perform functions comprising:

receiving, from a browser executing an interactive web application on a client machine, at a development application executing on a server, a series of instructions pertaining to creation or modification of a web page, the instructions being entered by a user of the client machine via interaction with a plurality of user interface elements displayed by the interactive web application in the browser, the instructions in the series of instructions renting to one or more of a layout including one or more divisions of the web page, one or more Cascading Style Sheets (CSS) properties for displaying one of the one or more divisions of the web page, one or more content feeds providing content to be displayed in one of the one or more divisions of the web page, a content tool to handle the one or more content feeds in the one of the one or more divisions of the web page, and a configuration of the content tool defining how the content tool handles the one or more content feeds;

generating, by the development application upon receipt by the server of each instruction, a mark-up language coding that modifies the layout and one or more functions of the web page based on the received series of instructions;

transmitting, upon receipt of a request entered by the user at the interactive web application, the mark-up language coding from the development application to the interactive web application for display in the browser as a real time preview of the web page; and storing, in a database accessible to the server, a final mark-up language coding for the web page upon receiving, from the interactive web application at the server, a request from the user to save changes to the web page;

assigning one or more content items to a specific content feed and associating, at the server, an identifier with the specific content feed, the one or more content items originating from a content provider external to the server, the series of instructions comprising the identifier, a designated division of the web page within which to display the specific content feed in the web page, and a selection and configuration of a specific content tool to handle the specific content feed; and providing, by the server, the final mark-up language coding to a second browser that navigates to a web page address identifying the web page, the final mark-up language coding causing the second browser to display the web page with the specific content feed provided dynamically and with the properties of the designated division and in accordance with the configuration of the specific content tool.

* * * * *